US012352081B2

(12) United States Patent
Breuninger et al.

(10) Patent No.: US 12,352,081 B2
(45) Date of Patent: Jul. 8, 2025

(54) EXTERIOR DOOR HANDLE SYSTEM FOR A PASSENGER CAR, AND PASSENGER CAR EQUIPPED THEREWITH

(71) Applicant: Bayerische Motoren Werke Aktiengesellschaft, Munich (DE)

(72) Inventors: Steve Breuninger, Gauting (DE); Michael Gegenbauer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 63 days.

(21) Appl. No.: 18/035,166

(22) PCT Filed: Jan. 13, 2022

(86) PCT No.: PCT/EP2022/050595

§ 371 (c)(1),
(2) Date: May 3, 2023

(87) PCT Pub. No.: WO2022/161774

PCT Pub. Date: Aug. 4, 2022

(65) Prior Publication Data

US 2023/0407686 A1 Dec. 21, 2023

(30) Foreign Application Priority Data

Jan. 27, 2021 (DE) ..................... 10 2021 101 741.6

(51) Int. Cl.
*E05B 85/06* (2014.01)
*E05B 17/04* (2006.01)
(Continued)

(52) U.S. Cl.
CPC ............ *E05B 85/06* (2013.01); *E05B 17/042* (2013.01); *E05B 53/005* (2013.01); *E05B 79/20* (2013.01); *E05B 85/10* (2013.01)

(58) Field of Classification Search
CPC .... E05B 17/042; E05B 53/003; E05B 53/005; E05B 79/20; E05B 85/06; E05B 85/10
See application file for complete search history.

(56) References Cited

U.S. PATENT DOCUMENTS 4,702,117 A * 10/1987 Tsutsumi ................ E05B 81/25 254/230
6,264,257 B1 * 7/2001 Meinke ................... E05B 79/20 292/336.3

(Continued)

FOREIGN PATENT DOCUMENTS

DE 100 17 439 A1 10/2001
DE 10 2006 029 570 A1 1/2007

(Continued)

OTHER PUBLICATIONS

International Search Report (PCT/ISA/210) issued in PCT Application No. PCT/EP2022/050595 dated Apr. 5, 2022 with English translation (four (4) pages).

(Continued)

*Primary Examiner* — Christopher J Boswell
(74) *Attorney, Agent, or Firm* — Crowell & Moring LLP

(57) ABSTRACT

An outside-door-handle system is configured to be attached to a door of a passenger motor vehicle. The outside-door-handle system includes a holder, a lock cylinder, and a Bowden cable. The holder is configured to be fastened to the door. The lock cylinder is operatively connected to the holder. The Bowden cable has a core, and is operatively connected at one end thereof to the lock cylinder and at the other end thereof to a door lock situated in the door. At a portion that is adjacent to the lock cylinder, the core of the Bowden cable is operatively connected to a toothed rack which is operatively connected to the lock cylinder.

9 Claims, 4 Drawing Sheets

(51) Int. Cl.
*E05B 53/00* (2006.01)
*E05B 79/20* (2014.01)
*E05B 85/10* (2014.01)

(56) References Cited

U.S. PATENT DOCUMENTS

| | | | | |
|---|---|---|---|---|
| 7,171,832 | B2 * | 2/2007 | Umino | E05B 79/20 292/216 |
| 7,213,428 | B2 * | 5/2007 | Harada | E05B 17/042 292/225 |
| 7,681,938 | B2 * | 3/2010 | Selle | E05B 79/20 296/121 |
| 7,703,310 | B2 * | 4/2010 | Usuzaki | E05B 79/20 292/201 |
| 8,061,742 | B2 * | 11/2011 | Machida | E05B 83/40 292/201 |
| 9,151,085 | B2 * | 10/2015 | Papanikolaou | E05B 81/25 |
| 10,301,854 | B2 * | 5/2019 | Christensen | E05B 81/90 |
| 10,538,944 | B2 * | 1/2020 | Hillgaertner | E05B 79/20 |
| 10,648,201 | B2 * | 5/2020 | Cumbo | E05B 77/06 |
| 11,525,292 | B2 * | 12/2022 | Jeong | E05B 81/76 |
| 11,578,513 | B2 * | 2/2023 | Heyduck | E05B 81/06 |
| 11,643,856 | B2 * | 5/2023 | Jeong | E05B 85/107 292/336.3 |
| 11,885,159 | B2 * | 1/2024 | Johann | E05B 83/24 |
| 12,116,811 | B2 * | 10/2024 | Moloney | E05B 1/003 |
| 12,129,690 | B2 * | 10/2024 | Nam | E05B 81/90 |

FOREIGN PATENT DOCUMENTS

| | | | | |
|---|---|---|---|---|
| DE | 10 2011 053 785 A1 | | 3/2013 | |
| DE | 10 2018 200 913 A1 | | 7/2019 | |
| EP | 3 441 551 A1 | | 2/2019 | |
| GB | 2291109 A | * | 1/1996 | E05B 17/042 |
| WO | WO 2015/000989 A1 | | 1/2015 | |

OTHER PUBLICATIONS

German-language Written Opinion (PCT/ISA/237) issued in PCT Application No. PCT/EP2022/050595 dated Apr. 5, 2022 (six (6) pages).

German-language Search Report issued in German Application No. 10 2021 101 741.6 dated Nov. 12, 2021 with partial English translation (11 pages).

* cited by examiner

EXTERIOR DOOR HANDLE SYSTEM FOR A PASSENGER CAR, AND PASSENGER CAR EQUIPPED THEREWITH

BACKGROUND

The present disclosure relates to an outside-door-handle system for a passenger motor vehicle, and to a passenger motor vehicle equipped therewith.

DE 10 2006 029 570 A1 has disclosed an outside-door-handle system for a passenger motor vehicle that has a holder which is fastened to a door of the passenger motor vehicle. Accommodated in the holder is a Bowden cable by means of whose core a door lock provided in the door can be operated. An exemplary Bowden cable is known from DE 10 2018 200 913 A1. At at least one end location, the cores of the known Bowden cables have a spherical or nipple-shaped end which is accommodated in a corresponding portion of the door lock.

SUMMARY

It is an object of the present disclosure to present an alternative to the known outside door handle.

Said object is achieved by an outside-door-handle system which is configured for being attached to a door of a passenger motor vehicle. The outside-door-handle system has a holder which is intended for being fastened to the door, a lock cylinder which is operatively connected to the holder, and a Bowden cable which is operatively connected at one end to the lock cylinder and at the other end to a door lock situated in the door. At its portion adjacent to the lock cylinder, the core of the Bowden cable is operatively connected to a toothed rack which is operatively connected to the lock cylinder. Particularly precise relative movement of the core of the Bowden cable with respect to the lock cylinder is advantageously provided in this way. The toothed rack may be fastened in a form-fitting or force-fitting manner to the core of the Bowden cable. In this regard, it is possible in particular for a portion of the core to be encapsulated with a suitable material, in particular a plastic, by injection molding in such a way that not only the desired geometry of the toothed-rack profile but also an intimate connection of core and toothed rack is obtained.

According to a preferred embodiment, the toothed rack of the outside-door-handle system according to the disclosure has a tooth profile configured for meshing directly with a corresponding tooth profile situated on the lock cylinder or with an intermediate piece which is fastened to the lock cylinder and which has a corresponding tooth profile. In this way, precise transmission of a movement of the core of the Bowden cable and the lock cylinder is provided. Furthermore, the use of an intermediate piece advantageously also allows a cost-reducing identical-parts strategy for lock cylinders, since, through relatively inexpensive adaptation of intermediate pieces, it is possible, even in the case of very different outside-door-handle systems, for a large number of identical lock cylinders to be provided.

In accordance with the basic principle, the toothed rack according to the disclosure may have a linear course. In other words, said toothed rack has, in a manner known per se, a substantially rectilinear elongate form from which there protrudes a number of teeth forming a linear tooth profile. Furthermore, that region of the toothed rack which is situated opposite the teeth (which is known as toothed ring in the case of circular toothed gears, but is to be referred as toothed base below) also has a substantially rectilinear elongate form or a rectilinear elongate course. This is not absolutely necessary, however. Rather, it is provided according to an advantageous refinement of the disclosure that the tooth profile of the toothed rack and/or the toothed base have/has a non-linear form or a non-linear course.

In accordance with the basic principle, the tooth profile of the lock cylinder or the tooth profile of the intermediate piece may have a circular form or a circular course. In this case, the teeth situated on a toothed ring would be radially distributed at least over a portion which is to mesh with the toothed rack. This is not absolutely necessary, however. Rather, it is provided according to a further preferred embodiment that the tooth profile of the lock cylinder or the tooth profile of the intermediate piece has a non-circular form or a non-circular outer contour or a non-circular course. In this regard, it is possible in particular for an ellipse geometry, an ellipse-like geometry or a rectangle geometry with suitably rounded corners to be provided.

Overall, by way of the aforementioned straight toothed racks in combination with circularly extending tooth profiles of lock cylinders or intermediate pieces, a constant torque profile is obtained during a movement of lock cylinder and toothed rack.

If, by contrast, a non-constant torque profile is desired, then the toothed racks are formed so as to extend in a non-linear manner and/or the tooth profiles of the lock cylinders or of the intermediate pieces are formed so as to extend in a non-circular manner.

According to a preferred embodiment of the outside-door-handle system according to the disclosure, a holding means on which the toothed rack is displaceably mounted is fastened to the holder. Alternatively, it is possible for the holding means to be accommodated in a functionally integrated manner in the support of the outside door handle of the door. This advantageously provides simple mounting of the toothed rack, by way of which a defined movement or control of the lock cylinder is made possible.

The precision of guidance and movement of the core of the Bowden cable is advantageously further improved if at least one portion thereof is movably guided in a guide portion provided at the holding means. The guide portion may, in accordance with the basic principle, be situated at any location of the holding means. However, the guide portion is particularly advantageously provided in an end region of the holding means.

A covering means covering at least the lock cylinder and/or the core of the Bowden cable is advantageously fastened to, or formed in a functionally integrated manner on, that side of the holder which faces away from the lock cylinder, said covering means being particular able to be in the form of a plate or some other suitable geometry. Consequently, the covering means acts as theft protection when the outside-door-handle system according to the disclosure is in the installation position, that is to say is in the state in which it is installed on the door of the passenger motor vehicle. The covering means may advantageously also perform the function of dust and water protection.

According to the disclosure, a fastening means is situated on the holder and is operatively connected to a corresponding holding-means fastening means of the holding means. This advantageously makes possible fastening of the holder to the holding means in a simple manner.

As emerges from that which has been stated above, the outside-door-handle system is designed as a highly integrated component which is able to be fitted in a simple manner. Owing to its relatively simple construction, it offers an inexpensive modular solution in which, firstly, reliable attachment of the Bowden cable, in particular the core thereof, and, secondly, a theft-protection function are realized.

The object stated further above is likewise achieved by a passenger motor vehicle having an outside door handle of the type disclosed above. The advantages presented above apply appropriately.

A detailed, non-prejudicial, in particular non-restrictive, description of an exemplary embodiment of the present disclosure is given below with reference to the appended figures, which are not true to scale, functionally identical elements being denoted by identical reference signs in the description:

DETAILED DESCRIPTION

Figure 1:
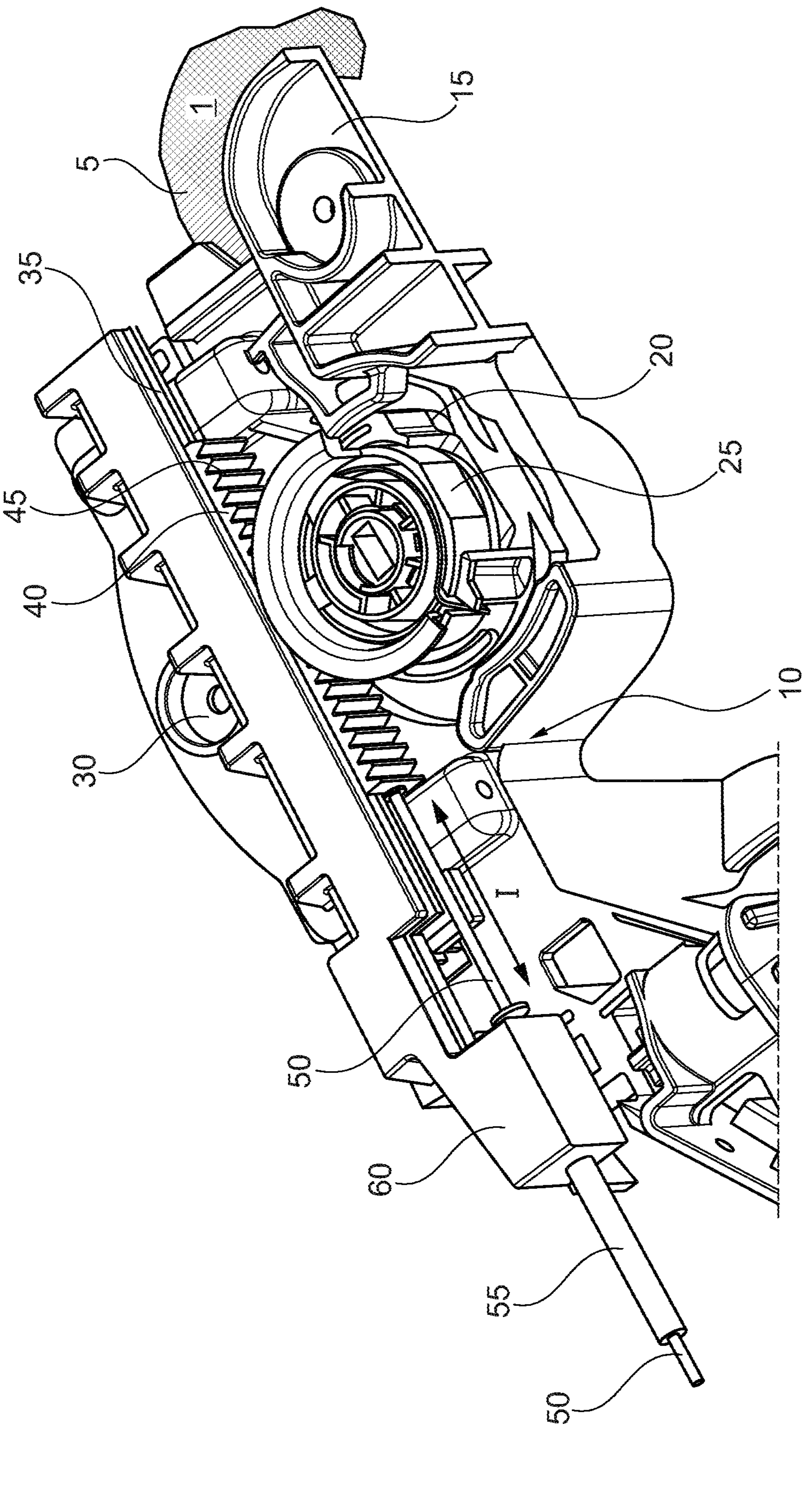
FIG. 1 is a perspective view of a part of an outside-door-handle system according to the disclosure which is fastened to a door of a passenger motor vehicle.

FIG. 1 shows—in a perspective view—a part of a passenger motor vehicle 1 (shown symbolically) that comprises a part of a door 5 (likewise shown symbolically). Also shown is a part of an outside-door-handle system 10 that, by means of a holder 15, is fastened to the door 5 via fastening means (not shown here), for example screws. On the holder 15, a partially illustrated lock cylinder 20, on the outer circumference of which there is arranged in a rotationally conjoint manner an intermediate piece 25 on the side facing away from the holder 15, can furthermore be seen. Opposite the intermediate piece 25, a holding means 30 having a substantially elongate shape is fastened to the holder 15. On its side facing toward the intermediate piece 25, the holding means 30 has a substantially rail-like portion 35 on which a toothed rack 40 is mounted in a longitudinally displaceable manner. The teeth 45 of the toothed rack 40 mesh in this case with teeth situated on the intermediate piece 25, these not being visible owing to the perspective selected here. The toothed rack 40 is fixedly injection-molded on an end of a core 50 of a Bowden cable 55, so that a movement of the core 50 effects a movement of the toothed rack 40, as symbolized by the double arrow I.

A guide portion 60 in which or on which the Bowden cable 55 is fastened in such a way that the core 50 can move therein is situated at an end of the holding means 30 that is remote from the lock cylinder 20. That end of the Bowden cable 55 which is opposite the intermediate piece 25 is operatively connected in a manner known per se to a door lock (not shown here). Thus, if the intermediate piece 25 is moved owing to a suitable movement of the lock cylinder 20, then said movement is transmitted up to the door lock via the toothed rack 40 and the core 50 of the Bowden cable 55.

Figure 2:
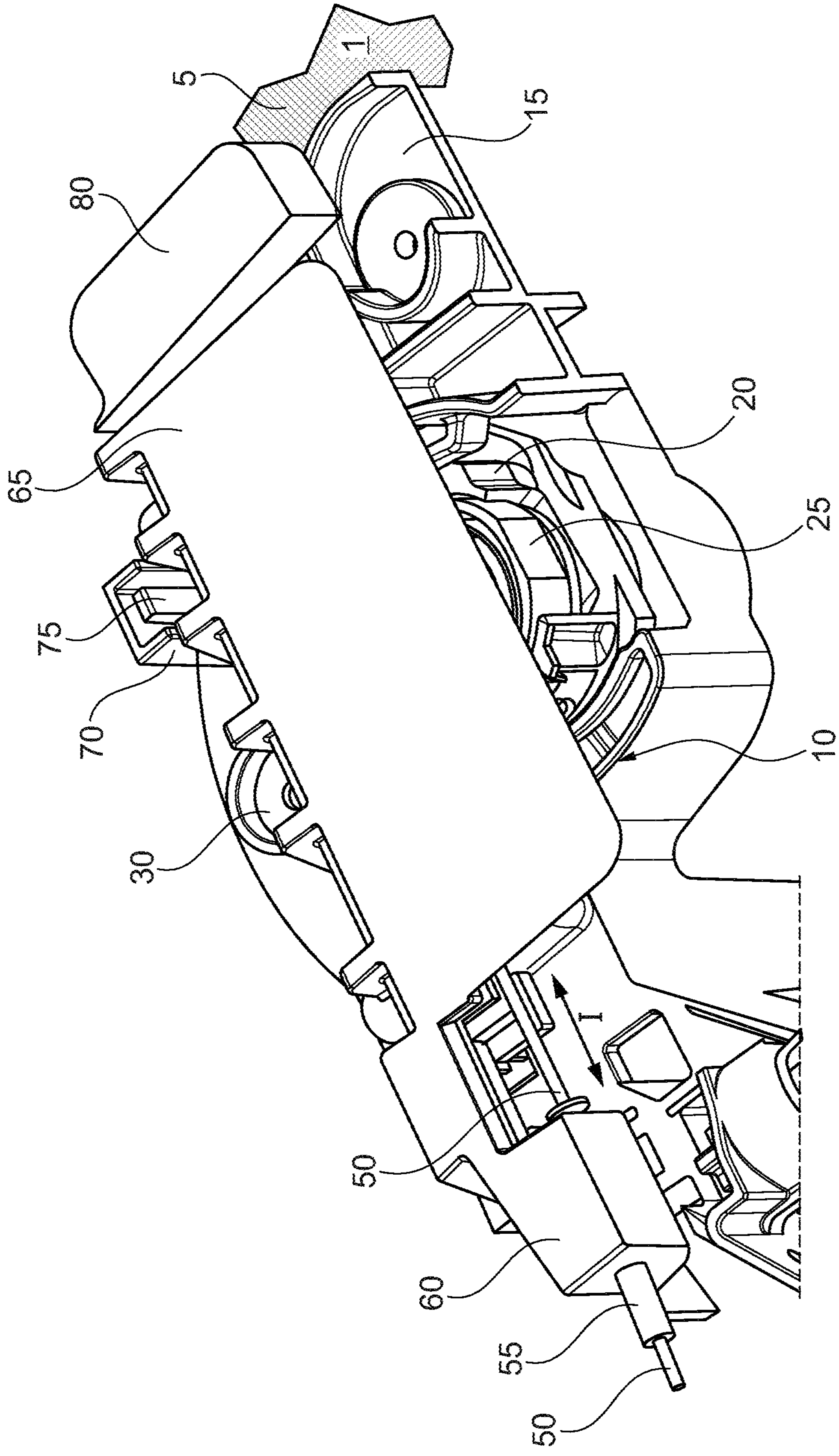
FIG. 2 show the outside-door-handle system illustrated in FIG. 1 with a plate which covers a lock cylinder and a part of a core of a Bowden cable.

The outside-door-handle system 10 is thus functional in accordance with the basic principle. As can be seen in FIG. 2, however, a covering means 65 which covers at least the lock cylinder 10 and a part of the core 50 of the Bowden cable 55 and, according to the present exemplary embodiment, is in the form of a plate is situated on that side of the holder 15 which faces away from the lock cylinder 20. In this way, access from outside the door 5 to the lock cylinder 20 and to that region of the core 50 which is adjacent thereto is not possible, whereby effective protection against unauthorized use of the outside-door-handle system 10, and thus against theft of the passenger motor vehicle 1, is provided.

As can furthermore be seen in FIG. 2, a fastening means 70 is situated on the holder 15, which fastening means is of C-shaped cross section according to the exemplary embodiment shown here and is operatively connected to a corresponding holding-means fastening means 75 of the holding means 30. It should be noted that any other suitable connection for fastening the stated elements to one another may also be provided. According to the present exemplary embodiment, the operative connection is in the form of a snap-action connection. The selected type of connection provides a simple and easily realizable fastening of the stated components.

Finally, a cover 80 with which an additional part of the holder 15 is covered is situated on that end of the covering means 65 which is opposite the guide portion 60. This may be formed on the holding means 30 with a film hinge and a water rib or else be of multi-part form.

Figures 3A, 3B, 3C:
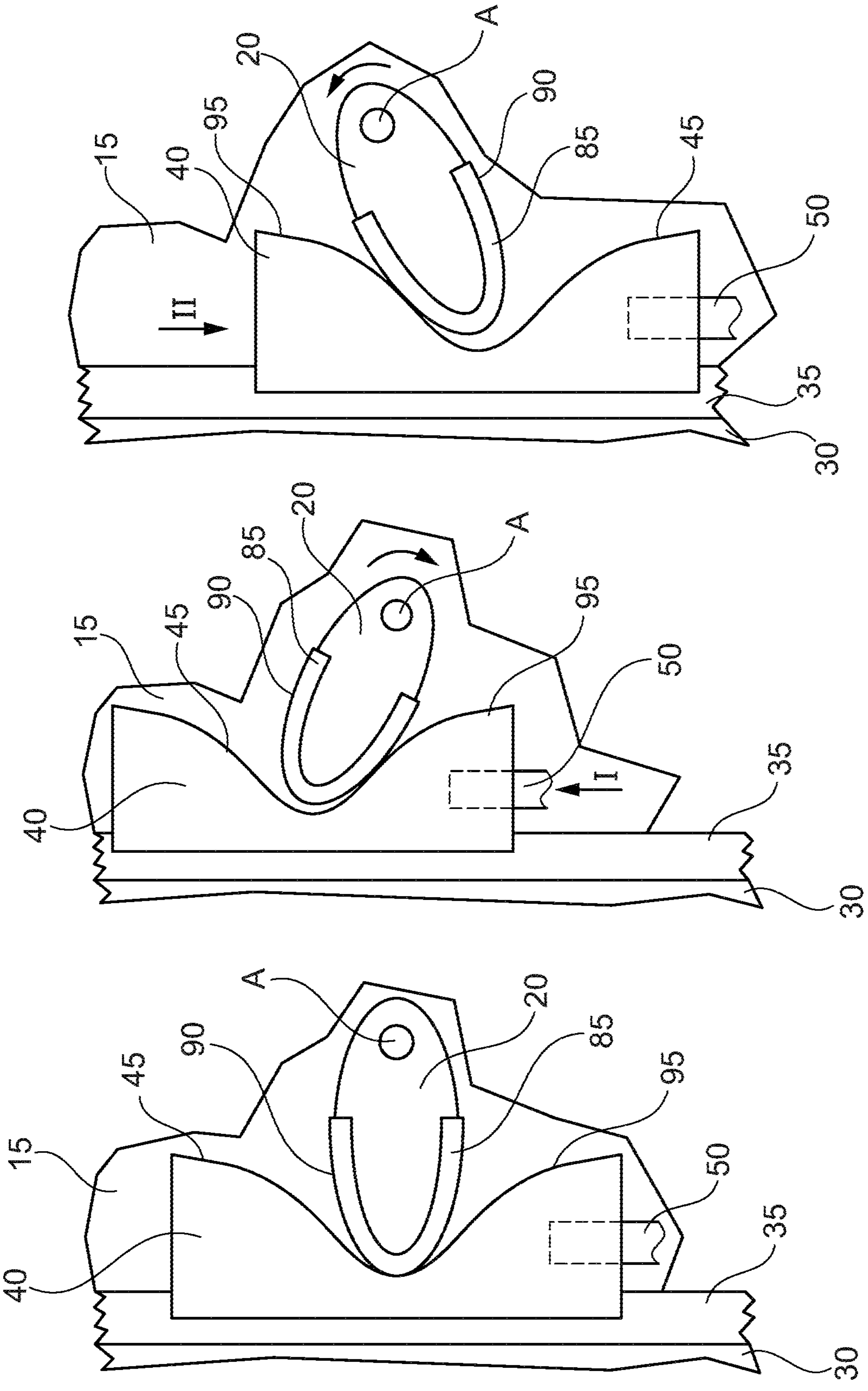
FIGS. 3A to 3C show, in a simplified plan view in different operating positions, of an outside-door-handle system.

FIGS. 3A to 3C then show, in a simplified plan view and in in each case different operating positions, an alternative embodiment of an outside-door-handle system 10 in relation to the embodiment illustrated in FIG. 1.

Specifically, FIG. 3A illustrates a part of an outside-door-handle system 10 at which a holding means 30, with a rail-like shoulder 35, and a lock cylinder 20, mounted eccentrically and so as to be rotatable about a pivot axis A, are fastened to a holder 15. As can be seen, the axis A is situated at a focal point of an ellipse. It goes without saying, however, that the axis A may also be positioned at any other suitable position.

Unlike the lock cylinder 20 or the intermediate piece 25 in FIG. 1, which has a circular course or a circular outer contour, the lock cylinder 20 shown in FIG. 3A has a non-circular course or a non-circular outer contour, having a substantially elliptical course or outer contour according to the present exemplary embodiment. Provided on its side facing toward the toothed rack 40 are teeth 85 (not illustrated in detail here), which are arranged not over the entire outer periphery of the lock cylinder 20 but only over a discrete portion thereof and likewise extend not in a circular manner but, according to the present exemplary embodiment, rather in an elliptical manner. Consequently, the lock cylinder 20 has a non-circular tooth profile 90. It goes without saying that teeth 85 may also be provided over the entire outer periphery of the lock cylinder 20.

Unlike the toothed rack 40 in FIG. 1, which has a linear course, the toothed rack 40 of the exemplary embodiment shown in FIG. 3A has a non-linear course or a non-circular outer contour of the tooth profile 95, which faces toward the lock cylinder 20. According to the present exemplary embodiment, the teeth 45 (not shown in more detail) have a substantially parabolic course when considered over the length of the toothed rack 40.

In FIG. 3A, the outside-door-handle system 10 is in a first operating state, in which a door lock (not shown here) is closed but not locked.

If the door lock is then to be opened according to a second operating state of the outside-door-handle system 10, then the lock cylinder 20 is rotated clockwise about the pivot axis A according to the illustration as per FIG. 3B. In this case, the teeth 85 of the lock cylinder 20 mesh with the corresponding teeth 45 of the toothed rack 40 in such a way that the latter is moved away from the door lock in a translational manner on the rail-like shoulder 35. In the process, the core 50 of the Bowden cable 55, which core is injection-molded in the toothed rack 40, is likewise moved away from the door lock (as symbolized by the arrow I), in order to release the door lock.

If the door lock is then to be closed and locked according to a third operating state of the outside-door-handle system 10, then the lock cylinder 20 is rotated counterclockwise about the pivot axis A according to the illustration as per FIG. 3C. In this case, the teeth 85 of the lock cylinder 90 mesh with the corresponding teeth 45 of the toothed rack 40 in such a way that the latter is moved in the direction of the door lock in a translational manner on the rail-like shoulder 35. In the process, the core 50 of the Bowden cable 55 injection-molded in the toothed rack 40 is likewise moved in the direction of the door lock (as symbolized by the arrow II), in order to lock the door lock.

Figure 4:
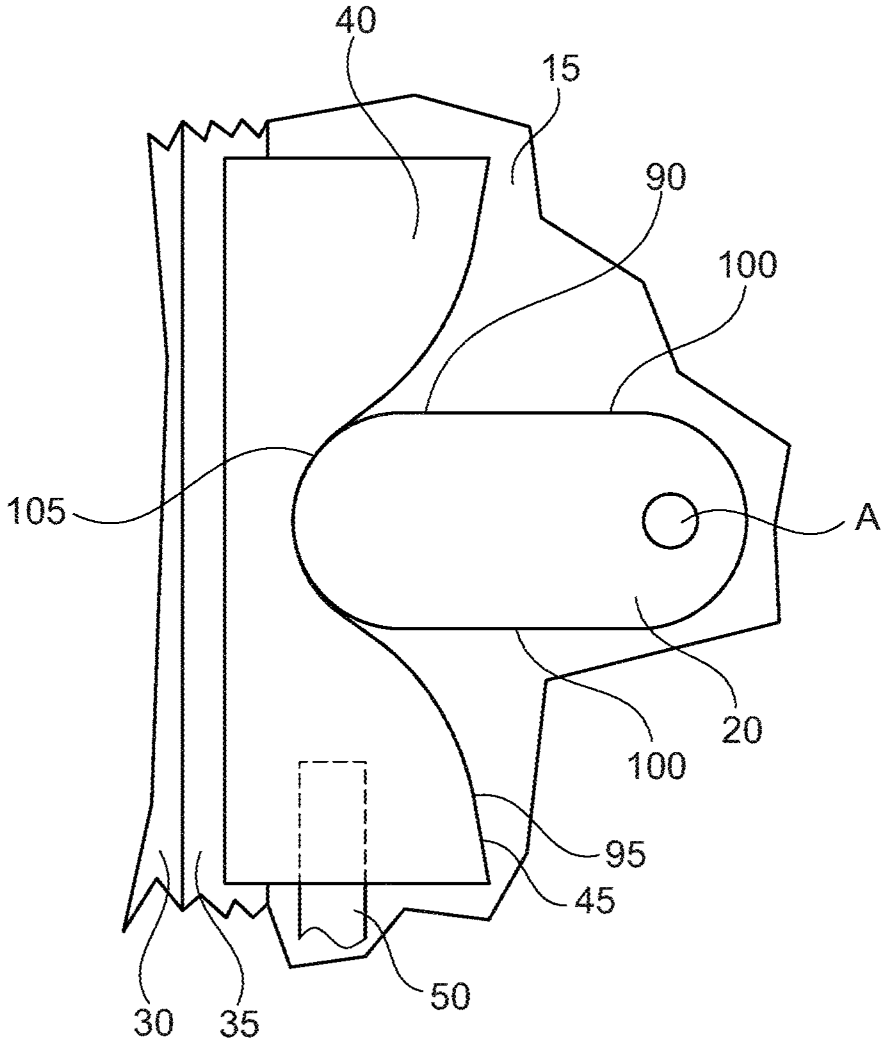
FIG. 4 shows, in a simplified plan view, of an outside-door-handle system in relation to the embodiments illustrated in FIGS. 1 and 2.

FIG. 4 shows, in a simplified plan view, an alternative embodiment of an outside-door-handle system 10 in relation to the embodiments illustrated in FIGS. 1 and 2, said outside-door-handle system being in the aforementioned first operating state.

The lock cylinder 20 shown here likewise has a non-circular course or a non-circular outer contour. Rather, the lock cylinder 20 consists of two substantially mutually parallel straight sides 100 which, at their end facing toward the toothed rack 40, are connected to one another via a circle portion 105. Teeth 85 (not illustrated in detail) are situated on the sides 100 along with the circle portion 105 and follow the aforementioned course. Consequently, the lock cylinder 20 has a non-circular tooth profile 90.

The toothed rack 40 shown in the present exemplary embodiment, too, has a non-linear course or a non-linear outer contour of the tooth profile 95, which faces toward the lock cylinder 20. Those teeth 45 of the toothed rack 40 which face toward the circle portion 105 in the operating position shown here are in engagement with the teeth 90 situated in the circle portion 105 of the lock cylinder 20. Those teeth 45 of the toothed rack 45 which are remote from the circle portion 105 then have a curved course such that the tooth profile 95 of the toothed rack 40 overall has a substantially concave course. According to the present embodiment, the second operating position illustrated in FIG. 3B can also be assumed through clockwise pivoting of the lock cylinder 20 about the axis of rotation A. Furthermore, according to the present embodiment, the third operating position illustrated in FIG. 3C can also be assumed through clockwise pivoting of the lock cylinder 20 about the axis of rotation A.

It goes without saying that the outside-door-handle systems 10 illustrated in FIGS. 3A to 3C and FIG. 4, too, may have a covering means 65 in order for the respective lock cylinders 20, intermediate pieces 25, toothed racks 25 and/or cores 50 to be at least partially covered.

LIST OF REFERENCE SIGNS

1 Passenger motor vehicle
5 Door
10 Outside-door-handle system
15 Holder
20 Lock cylinder
25 Intermediate piece
30 Holding means
35 Rail-like portion
40 Toothed rack
45 Teeth
50 Core
55 Bowden cable
60 Guide portion
65 Covering means
70 Fastening means
75 Holding fastening means
80 Cover
85 Teeth
90 Tooth profile (lock cylinder)
95 Tooth profile (toothed rack)
100 Parallel sides
105 Circle portion
A Pivot axis
I Movement direction
II Movement direction

The invention claimed is:

1. An outside-door-handle system which is configured to be attached to a door of a passenger motor vehicle, comprising:
- a holder which is configured to be fastened to the door;
- a lock cylinder which is operatively connected to the holder;
- a Bowden cable which has a core and which is operatively connected at one end thereof to the lock cylinder and at the other end thereof to a door lock situated in the door,
- wherein, at a portion that is adjacent to the lock cylinder, the core of the Bowden cable is operatively connected to a toothed rack which is operatively connected to the lock cylinder.

2. The outside-door-handle system according to claim 1, wherein the toothed rack has a tooth profile that is configured to mesh directly with a corresponding tooth profile that is situated on the lock cylinder or with an intermediate piece which is fastened to the lock cylinder and which has a corresponding tooth profile.

3. The outside-door-handle system according to claim 2, wherein the tooth profile of the toothed rack has a non-linear course.

4. The outside-door-handle system according to claim 3, wherein the tooth profile of the lock cylinder or the tooth profile of the intermediate piece has a non-circular course.

5. The outside-door-handle system according to claim 4, further comprising: a holding means on which the toothed rack is displaceably mounted, wherein the holding means is fastened to the holder.

6. The outside-door-handle system according to claim 5, wherein the holding means has at least one guide portion in which the core of the Bowden cable is movably guided.

7. The outside-door-handle system according to claim 6, further comprising: a covering means that is configured to cover at least the lock cylinder, wherein the intermediate piece and/or the core of the Bowden cable is fastened to a side of the holder which faces away from the lock cylinder.

8. The outside-door-handle system according to claim 7, further comprising: a fastening means that is situated on the holder and that is operatively connected to a corresponding holding-means fastening means of the holding means.

9. A passenger motor vehicle comprising:
- at least one door; and
- the outside-door-handle system according to claim 1 situated on the at least one door.

* * * * *